(12) United States Patent
Kim et al.

(10) Patent No.: US 12,117,306 B2
(45) Date of Patent: Oct. 15, 2024

(54) NAVIGATION DEVICE, NAVIGATION SYSTEM, AND METHOD OF OPERATING THE SAME

(71) Applicant: THINKWARE CORPORATION, Seongnam-si (KR)

(72) Inventors: Hyungjun Kim, Seoul (KR); Taekyu Han, Seongnam-si (KR)

(73) Assignee: THINKWARE CORPORATION, Seongnam-si (KR)

(*) Notice: Subject to any disclaimer, the term of this patent is extended or adjusted under 35 U.S.C. 154(b) by 457 days.

(21) Appl. No.: 17/223,275

(22) Filed: Apr. 6, 2021

(65) Prior Publication Data

US 2021/0223057 A1 Jul. 22, 2021

Related U.S. Application Data

(63) Continuation of application No. 17/060,798, filed on Oct. 1, 2020, which is a continuation of application (Continued)

(30) Foreign Application Priority Data

May 12, 2009 (KR) .......................... 10-2009-0041119

(51) Int. Cl.
*G01C 21/36* (2006.01)
*G01C 21/34* (2006.01)
*G08G 1/0968* (2006.01)

(52) U.S. Cl.
CPC ....... *G01C 21/362* (2013.01); *G01C 21/3461* (2013.01); *G01C 21/3484* (2013.01); (Continued)

(58) Field of Classification Search
CPC .............. G01C 21/362; G01C 21/3461; G01C 21/3484; G01C 21/3617; G08G 1/096816; G08G 1/09685; G08G 1/096866
(Continued)

(56) References Cited

U.S. PATENT DOCUMENTS 6,167,346 A 12/2000 Fukawa
6,937,934 B2 8/2005 Kuroda et al.
(Continued)

FOREIGN PATENT DOCUMENTS

EP 1003017 5/2000
JP 2002311822 10/2002
(Continued)

OTHER PUBLICATIONS

Non-Final dated Aug. 18, 2021, issued in U.S. Appl. No. 16/457,174 (33 pages).
(Continued)

*Primary Examiner* — Mahmoud S Ismail
(74) *Attorney, Agent, or Firm* — WHDA, LLP

(57) ABSTRACT

Navigation devices and methods of operation are provided. The navigation device includes a communication unit; a display; an input unit for receiving an input of data; a communication unit; and a controller for controlling operation of the display and the input unit. The controller connects to a data server through the communication unit, requests path setting information to the data server, receives the path setting information from the data server, acquires present position information of the navigation device, acquires a user moving path by reflecting the acquired position information and the received path setting information, and sets the user moving path as a guidance path. In this case, the path setting information is generated in another electronic
(Continued)

device or the data server based on user input information input from the another electronic device.

17 Claims, 13 Drawing Sheets

Related U.S. Application Data

No. 16/457,174, filed on Jun. 28, 2019, now Pat. No. 11,326,894, which is a continuation of application No. 16/132,012, filed on Sep. 14, 2018, now Pat. No. 10,866,110, which is a continuation of application No. 14/931,485, filed on Nov. 3, 2015, now Pat. No. 10,107,637, which is a continuation of application No. 13/319,733, filed as application No. PCT/KR2010/002232 on Apr. 12, 2010, now Pat. No. 9,208,685.

(52) U.S. Cl.
CPC ... *G01C 21/3617* (2013.01); *G08G 1/096816* (2013.01); *G08G 1/09685* (2013.01); *G08G 1/096866* (2013.01)

(58) Field of Classification Search
USPC .......................................................... 701/537
See application file for complete search history.

(56) References Cited

U.S. PATENT DOCUMENTS

| | | | |
|---|---|---|---|
| 6,993,350 | B2 | 1/2006 | Katoh |
| 7,107,353 | B1 | 9/2006 | Rice |
| 7,672,778 | B1 | 3/2010 | Elliott |
| 8,682,576 | B2 | 3/2014 | Kurtti et al. |
| 9,153,130 | B2 | 10/2015 | Iwahori et al. |
| 9,965,035 | B2 | 5/2018 | Santamaria et al. |
| 10,244,361 | B1 | 3/2019 | Cooper et al. |
| 2002/0165665 | A1* | 11/2002 | Kim ............... G01C 21/3632 340/990 |
| 2003/0083807 | A1 | 5/2003 | Kuroda et al. |
| 2004/0098175 | A1 | 5/2004 | Said et al. |
| 2004/0249568 | A1 | 12/2004 | Endo et al. |
| 2005/0043884 | A1 | 2/2005 | Atarashi |
| 2005/0055155 | A1 | 3/2005 | Mafune |
| 2005/0071081 | A1* | 3/2005 | Hirose ............... G01C 21/20 340/995.13 |
| 2005/0140524 | A1 | 6/2005 | Kato et al. |
| 2005/0149253 | A1 | 7/2005 | Nambata |
| 2006/0058953 | A1 | 3/2006 | Cooper et al. |
| 2006/0100778 | A1 | 5/2006 | Lee et al. |
| 2007/0032949 | A1 | 2/2007 | Arai et al. |
| 2007/0124157 | A1* | 5/2007 | Laumeyer ............... G01C 21/30 701/420 |
| 2007/0244638 | A1 | 10/2007 | Lee |
| 2007/0276585 | A1 | 11/2007 | Hisada et al. |
| 2008/0120021 | A1 | 5/2008 | Kaneda et al. |
| 2008/0120023 | A1 | 5/2008 | Ofek |
| 2009/0017803 | A1* | 1/2009 | Brillhart ............... G01C 21/20 455/457 |
| 2009/0091439 | A1 | 4/2009 | Sekiyama et al. |
| 2009/0198443 | A1 | 8/2009 | Yamazaki |
| 2009/0248285 | A1 | 10/2009 | Bauer |
| 2010/0029293 | A1 | 2/2010 | Bergh et al. |
| 2010/0287572 | A1 | 11/2010 | Lee |
| 2011/0125398 | A1 | 5/2011 | Bos |
| 2012/0010816 | A1 | 1/2012 | Uyama et al. |
| 2012/0101716 | A1 | 4/2012 | Kim |
| 2012/0191290 | A1 | 7/2012 | Bourque et al. |

FOREIGN PATENT DOCUMENTS

| | | |
|---|---|---|
| JP | 3849496 B2 | 5/2003 |
| JP | 2003-202230 A | 7/2003 |
| JP | 3864911 B2 | 8/2003 |
| JP | 2003240588 | 8/2003 |
| JP | 2003-247844 A | 9/2003 |
| JP | 2005134350 A | 5/2006 |
| JP | 3864713 B2 | 1/2007 |
| JP | 2003187523 | 7/2007 |
| JP | 2007172417 | 7/2007 |
| JP | 3996798 B2 | 10/2007 |
| JP | WO2005/038745 A1 | 11/2007 |
| JP | 2008-233105 A | 10/2008 |
| KP | 1020070013887 | 1/2007 |
| KR | 1020040031139 | 4/2004 |
| KR | 1020080083823 | 9/2008 |
| KR | 1020090020387 | 2/2009 |
| WO | 2008038605 | 4/2008 |
| WO | 2008064267 | 5/2008 |

OTHER PUBLICATIONS

U.S. Appl. No. 16/132,012. Final Office Action dated Jun. 8, 2020, 33 pages.

Non-Final Office Action dated Jan. 3, 2023, issued in U.S. Appl. No. 17/060,798 (40 pages).

Non-Final Office Action dated Jan. 20, 2022, issued in U.S. Appl. No. 16/877,736. (45 pages).

\* cited by examiner

NAVIGATION DEVICE, NAVIGATION SYSTEM, AND METHOD OF OPERATING THE SAME

CROSS-REFERENCE TO RELATED APPLICATIONS

This application is a continuation application of U.S. application Ser. No. 17/060,798, filed on Oct. 1, 2020, which is a continuation of U.S. application Ser. No. 16/457,174, filed on Jun. 28, 2019, which is a continuation of U.S. application Ser. No. 16/132,012, filed on Sep. 14, 2018, which is a continuation of U.S. application Ser. No. 14/931,485 filed on Nov. 3, 2015, which is a continuation of U.S. application Ser. No. 13/319,733 filed on Dec. 20, 2011, which is a national-stage application under 35 USC 371 of PCT/KR2010/002232 filed on Apr. 12, 2010, which claims the benefit of priority from Korean Patent Application No. 10-2009-0041119 filed on May 12, 2009, and the contents of the aforementioned applications are incorporated herein by reference in their entirety.

TECHNICAL FIELD

The present invention relates to a navigation device, a navigation system, and a method of operating the same.

BACKGROUND ART

As an Internet network is opened and a law related to position information is enacted, industry of a location based service (LBS) has been activated. As one of such an LBS, navigation industry for measuring a present position of a terminal and grasping and guiding a moving path to a destination has also been rapidly activated. Accordingly, a research for a navigation terminal has been actively performed.

Conventionally, in order to receive a guide of a path using a navigation terminal, a method of directly inputting information such as a destination through the navigation terminal has been used.

Further, information for a path search is obtained using only algorithm within the navigation terminal. According to such a conventional method, an input of various information for receiving a guide of a moving path through the navigation terminal gives inconvenience to a user or operates as a factor to obstruct stability of vehicle driving. Furthermore, it cannot satisfy a request of various users to search for a unified moving path using only information of the navigation terminal.

DISCLOSURE

Technical Problem

The present invention has been made in view of the above problems, and provides a navigation device and navigation system that can enable a user to more easily receive a guide of a desired moving path.

The present invention has been made in view of the above problems, and further provides a navigation device and navigation system that can guide a more appropriate and useful moving path to each user.

Technical Solution

In an aspect, a navigation device includes: a communication unit; a display; an input unit for receiving an input of data; a communication unit; and a controller for controlling operation of the display and the input unit. The controller connects to a data server through the communication unit, requests path setting information to the data server, receives the path setting information from the data server, acquires present position information of the navigation device, acquires a user moving path by reflecting the acquired position information and the received path setting information, and sets the user moving path as a guidance path. In this case, the path setting information is generated in another electronic device or the data server based on user input information input from the another electronic device.

In another aspect, a method of operating a navigation device includes: connecting to a communication network for performing data communication with a data server; requesting path setting information to the data server; receiving the path setting information from the data server; acquiring present position information of the navigation device; acquiring a user moving path based on the acquired position information and the received path setting information; and setting the user moving path as a guidance path. In this case, the path setting information is generated in another electronic device or the data server based on user input information input through the another electronic device.

In another aspect, a method of operating a data server includes: providing a user interface to a first electronic device in order to receive an input of user input information including starting point information and destination point information and at least one of passing point information and essential passing segment information; receiving the user input information input through the user interface; acquiring moving path information based on the received user input information, wherein the moving path information is an entire path from the starting point to the destination point; forming path setting information including the input destination information and at least one of the passing point information, the moving path information, and the essential passing segment information; and transmitting, when a request of the path setting information receives from the navigation device, the path setting information to the navigation device.

In another aspect, a data server includes: a server communication unit, a server storage unit, and a server controller for controlling operation of the server communication unit and the server storage unit. The server controller provides a user interface to a first electronic device in order to receive an input of user input information including starting point information and destination point information and at least one of passing point information and essential passing segment information; receives the user input information input through the user interface; acquires moving path information based on the received user input information. In this case, the moving path information is an entire path from the starting point to the destination point. Thereafter, path setting information including the input destination information and at least one of the passing point information, the moving path information, and the essential passing segment information is formed and when a request for the path setting information receives from the navigation device, the path setting information is transmitted to the navigation device.

Advantageous Effects

According to the present invention, the following advantages are obtained.

First, a user can receive a path guidance using a navigation device through a minimum manipulation.

Thereby, manipulation convenience of the navigation device can increase and accident dangerousness due to a manipulation of the navigation device while driving can be reduced.

Second, the user can effectively search for an appropriate path or plan a trip with various information by connecting to a data server having various data using an IPTV or a PC at a home.

Third, the user can receive additional interest information through the navigation device when actually traveling by registering/inputting various additional interest information (historical archaeological sites, good taste restaurants, and recommended tourist sites) at a periphery of the found path as user input information and thus can beneficially use a boring moving time to a destination.

BEST MODE

Figure 1:
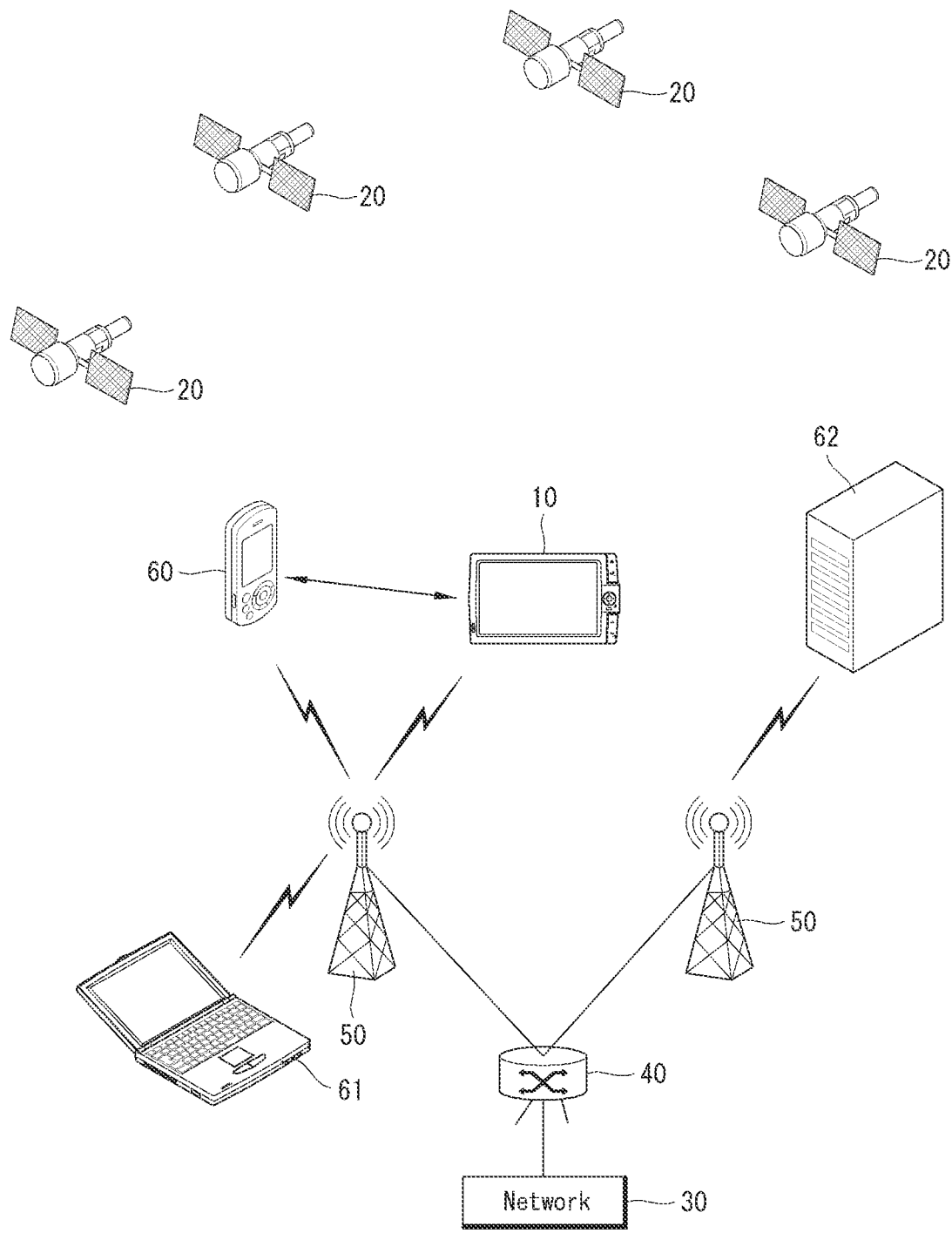
FIG. 1 is a diagram illustrating an example of a communication network for using when a navigation device transmits/receives various data according to an exemplary embodiment of the present invention.

Hereinafter, an exemplary embodiment of the present invention will be described in detail with reference to the attached drawings. Other objects and advantages of the present invention will be described and will be understood by exemplary embodiments of the invention. Like reference numerals designate like elements throughout the specification. Further, detailed descriptions of well-known functions and structures incorporated herein may be omitted to avoid obscuring the subject matter of this document.

FIG. 1 is a diagram illustrating an example of a communication network for using when a navigation device transmits/receives various data according to an exemplary embodiment of the present invention.

Referring to FIG. 1, a navigation device 10 receives a signal for calculating a present position of the navigation device 10 from at least three artificial satellites 20. The navigation device 10 receives a signal from the artificial satellite 20 through a position check unit 110 to be described later and calculates a present position coordinate using the received information. The position coordinate is formed with a longitude and a latitude.

The navigation device 10 provides a moving path from a present position to a position of a desired destination to a user based on position information acquired through the position check unit 110.

The navigation device 10 can be variously embodied in a form of a navigation terminal, a mobile phone, a portable multimedia player (PMP), and a personal digital assistant (PDA) that may be used with mounted in vehicles.

The navigation device 10 is connected to a network 30 through wired or wireless means. The navigation device 10 may be connected by wireless to the network 30 through an access control router (ACR) 40 and a radio access station (RAS) 50. The navigation device 10 is connected by wired or wireless means to the network 30 through a network communication unit 120 to be described later. The navigation device 10 transmits/receives various data by connecting by a wired or wireless means to the network 30 such as Internet. Various electronic devices 60, 61, and 62 in addition to the navigation device 10 may be connected to the network 30 by a wired or wireless means with the above method.

The navigation device 10 transmits and receives data to and from other electronic devices located at a relatively short range from the navigation device 10 through a short range communication module 140 to be described later. For example, as shown in FIG. 1, the navigation device 10 may transmit and receive data to and from a mobile phone 60 located at a relatively short range.

The navigation device 10 can provide a moving path from a present position to a position of a desired destination to a user based on position information acquired by a global navigation satellite system (GNSS).

In general, a GNSS, which is a method of calculating a position of a stationary or moving object using an artificial satellite, is a radio navigation system that calculates a receiver's position using an electric wave signal received from the artificial satellite 20. Such a GNSS includes a global positioning system (GPS), Galileo, a global orbiting navigational satellite system (GLONASS), Beidou navigational satellite system (COMPASS), Indian regional navigational satellite system (IRNSS), and Quasi-Zenith satellite system (QZSS) according to an operation subject.

Figure 2:
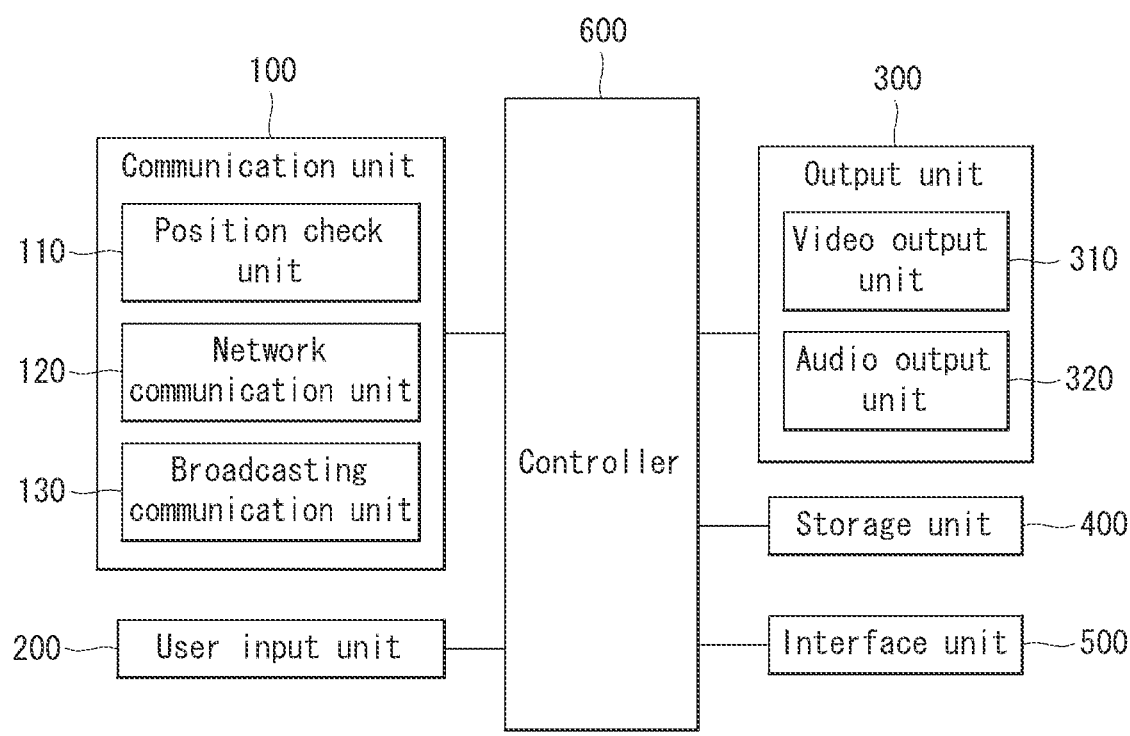
FIG. 2 is a block diagram illustrating a configuration of a navigation device according to an exemplary embodiment of the present invention.

FIG. 2 is a block diagram illustrating a configuration of a navigation device according to an exemplary embodiment of the present invention. Hereinafter, a configuration of the navigation device 10 according to an exemplary embodiment of the present invention will be described with reference to FIG. 2.

Referring to FIG. 2, the navigation device 10 includes a communication unit 100, a user input unit 200, an output unit 300, a storage unit 400, an interface unit 500, and a controller 600.

The communication unit 100 includes a position check unit 110, a network communication unit 120, and a broadcasting communication unit 130. As described with reference to FIG. 1, the position check unit 110 receives predetermined data from the artificial satellite 20 and checks a present position based on the received data. The present position may be expressed with a coordinate, and the coordinate may be expressed with a longitude and a latitude.

The network communication unit 120 enables the navigation device 10 to perform wired/wireless communication with the network 30 such as Internet. For example, the network communication unit 120 may have an application for transmitting/receiving data through Internet technology such as a wireless broadband (Wibro) a wireless LAN (WLAN), a LAN, or a WAN. The navigation device 10 transmits/receives various information by connecting to the network through the network communication unit 120. Further, the navigation device 10 may connect to a mobile communication network through the network communication unit 120. In this case, although not shown in the drawings, the network communication unit 120 may further include a separate module for connecting to the mobile communication network.

The broadcasting communication unit 130 enables the navigation device 10 to receive a broadcasting signal transmitted through various broadcasting systems. The received broadcasting signal may include various additional information and particularly, the additional information may include information about a real time road traffic situation.

The user input unit 200 is used for a user to input a command and data for operating the navigation device 10. The user input unit 200 includes a keypad, a touchpad, and a touch screen.

The output unit 300 includes a video output unit 310 and an audio output unit 320.

The video output unit 310 visually transfers various information to the user. For example, the video output unit 310 may provide information to transfer to the user in a form of a graphic image or a moving picture. The video output unit 310 includes a display device embodied in a liquid crystal display (LCD), a plasma display panel (PDP), an organic light-emitting diode display (OLED), and e-paper. When the user input unit 200 is formed in a touch screen, the user input unit 200 may be coupled to the video output unit 310.

The audio output unit 320 transfers various information using auditory sense to the user. For example, the audio output unit 320 may provide various guidance messages and guidance broadcasting to the user. The audio output unit 320 may include a speaker.

The storage unit 400 stores information of various software and data necessary for operation of the navigation device 10. For example, the storage unit 400 stores a map database of map data of a national map and path guidance data related to the map data. The storage unit 400 stores a path guidance control program for controlling general operations of a navigation system including a path guidance function, a user interface (UI) control program for controlling execution of a user interface for path search and path setting, and a search control program for controlling a facility search of at least one item of a search path.

The storage unit 400 is detachably mounted in the navigation device 10. The storage unit 400 includes a volatile memory and/or a non-volatile memory such as a flash memory, a dynamic random access memory (DRAM), and a static random access memory and includes a card type memory such as an SD memory card.

The interface unit 500 connects the navigation device 10 to external devices. For example, the navigation device 10 may be connected to a power supply device, an audio and video input device, and an audio and video output device through the interface unit 500.

The controller 600 controls operation of the above-described elements and controls general operations of the navigation device 10 according to exemplary embodiments of the present invention.

The controller 600 calculates a present position received from the position check unit 110 under a control program and controls operation of the video output unit 310 and the audio output unit 320 in order to appropriately perform path guidance to the user. For example, the controller 600 may provide various information for notifying the user of a location of a present vehicle using the map data, routing an optimal path to a desired destination, and guiding a vehicle to travel according to the routed path.

Hereinafter, a navigation system according to an exemplary embodiment of the present invention will be described.

Figure 3:
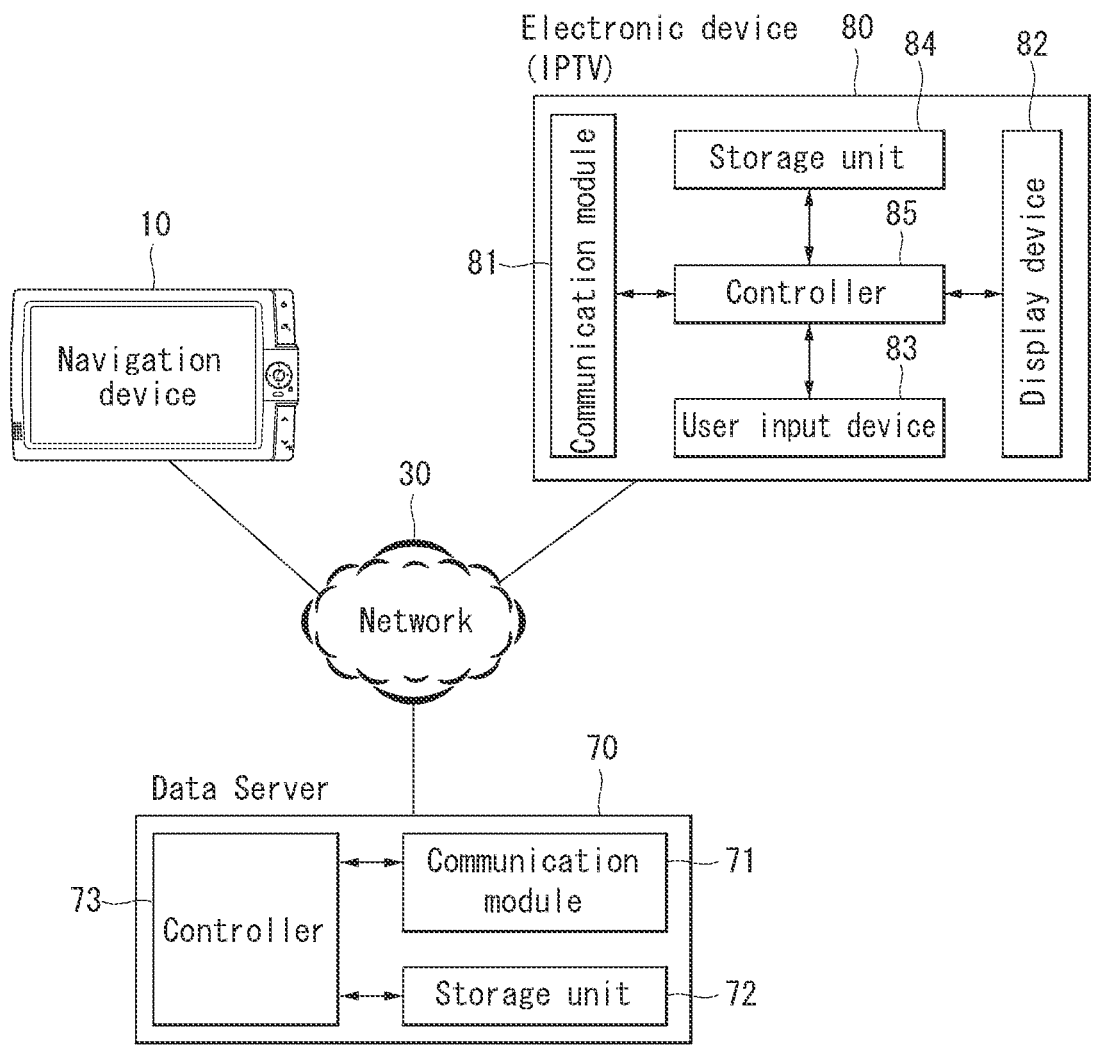
FIG. 3 is a block diagram illustrating a configuration of a navigation system according to an exemplary embodiment of the present invention.

FIG. 3 is a block diagram illustrating a configuration of a navigation system according to an exemplary embodiment of the present invention.

Referring to FIG. 3, the navigation system includes a navigation device 10, an electronic device 80, a network 30, and a data server 70. The navigation device 10 and the network 30 have been described in detail in the foregoing description and therefore a description thereof will be omitted.

The data server 70 includes a communication module 71, a storage unit 72, and a controller 73.

The data server 70 is connected to the network 30 through the communication module 71. The storage unit 72 stores various data and software for operating the data server 70. The controller 73 generally controls operation of the communication module 71 and the storage unit 72.

The electronic device 80 includes a communication module 81, a display device 82, a user input device 83, a storage unit 84, and a controller 85. The electronic device 80 is connected to the network 30 through the communication module 81. The display device 82 visually displays various information. The electronic device 80 receives an input of various data and/or instruction from the user through the user input device 83. The storage unit 84 stores various data and software necessary for operating the electronic device 80. The controller 85 controls general operations of the communication module 81, the display device 82, the user input device 83, and the storage unit 84. The electronic device 80 may include an Internet protocol television (IPTV), a personal computer (PC), a personal digital assistant (PDA), and a smart phone.

Hereinafter, operation of the navigation system according to a first exemplary embodiment of the present invention will be described in detail.

Figure 4:
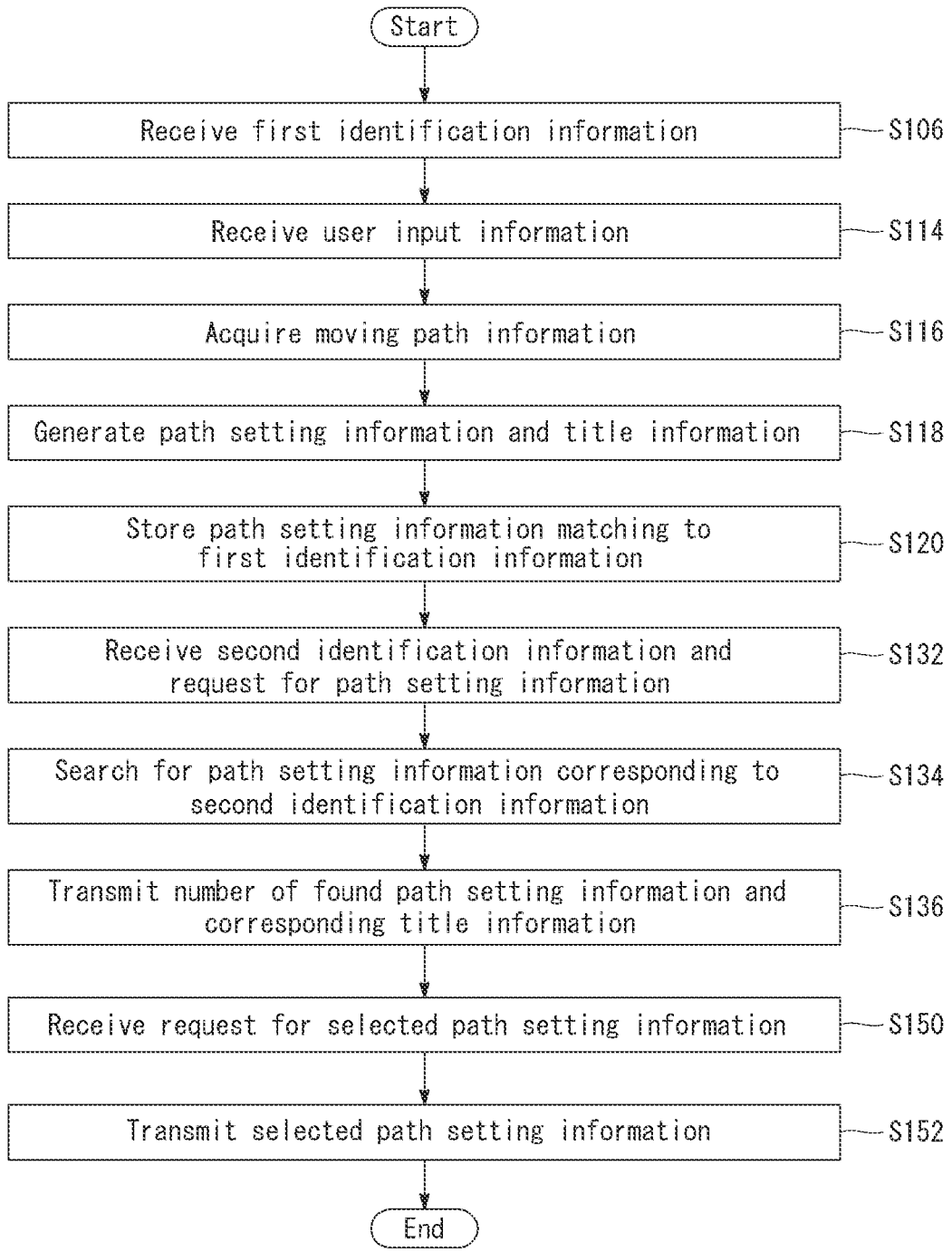
FIG. 4 is a flowchart illustrating operation of a data server according to a first exemplary embodiment of the present invention.
Figure 5:
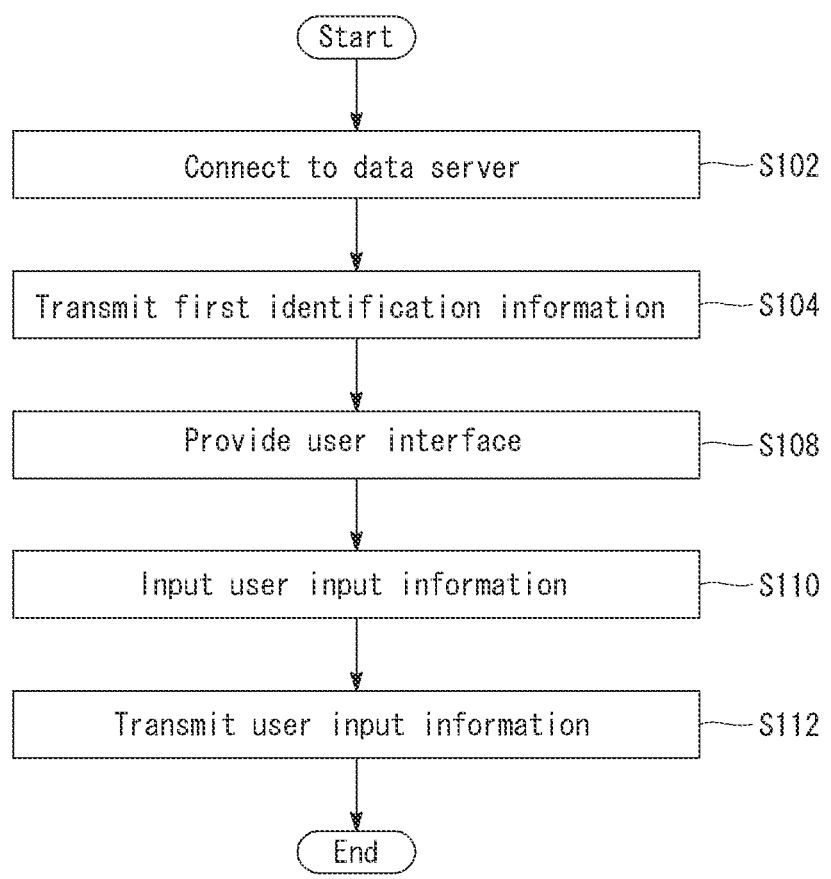
FIG. 5 is a flowchart illustrating operation of an electronic device according to a first exemplary embodiment of the present invention.
Figure 6:
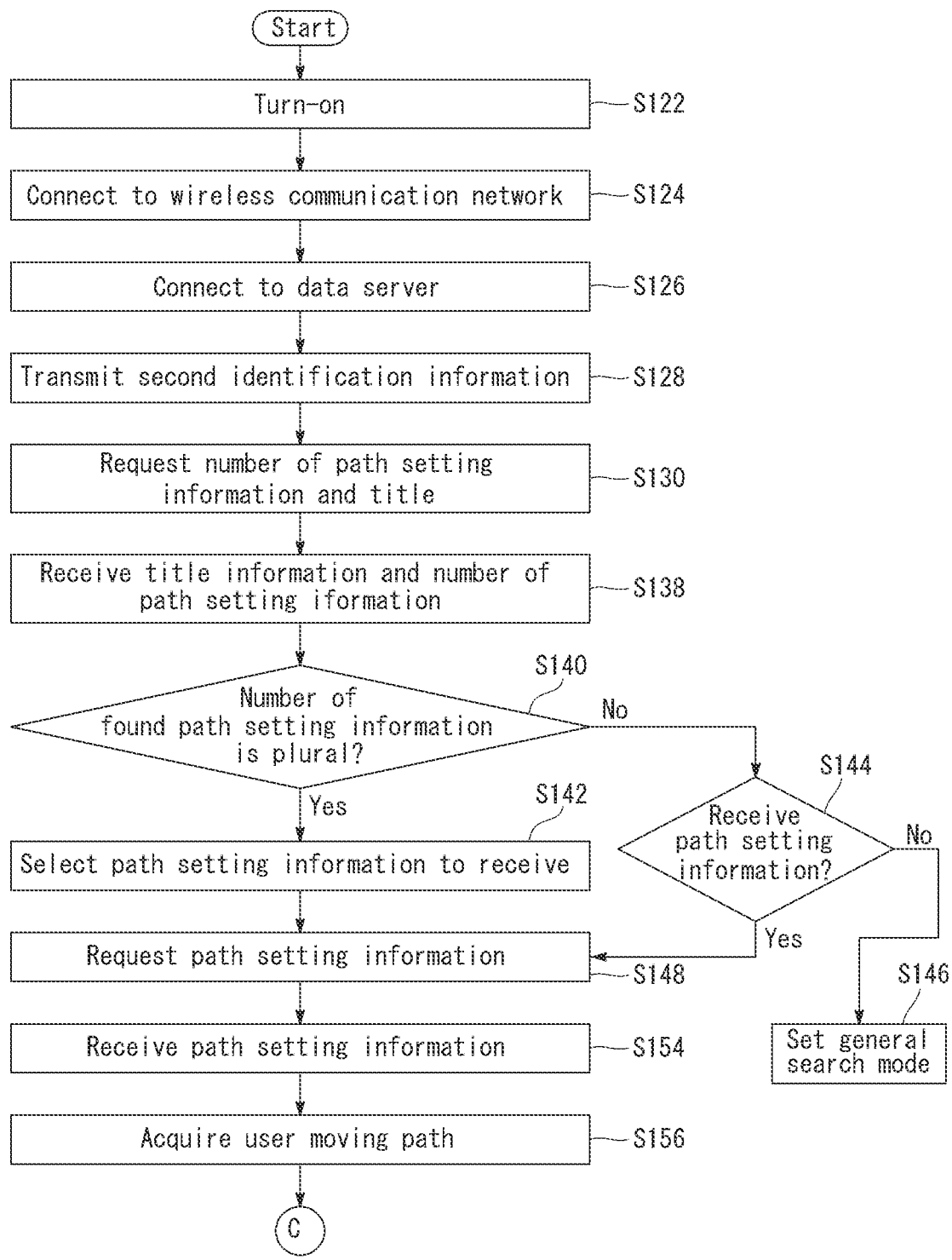
FIG. 6 is a flowchart illustrating operation of a navigation device according to a first exemplary embodiment of the present invention.
Figure 7:
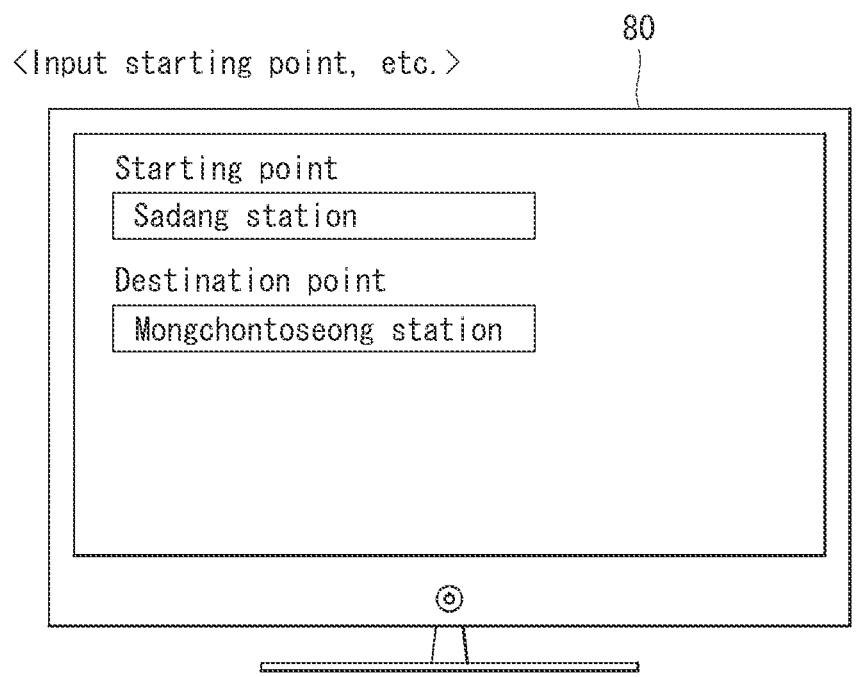
FIGS. 7 to 10 are diagrams illustrating screens that receive user input information according to a first exemplary embodiment of the present invention.
Figure 8:
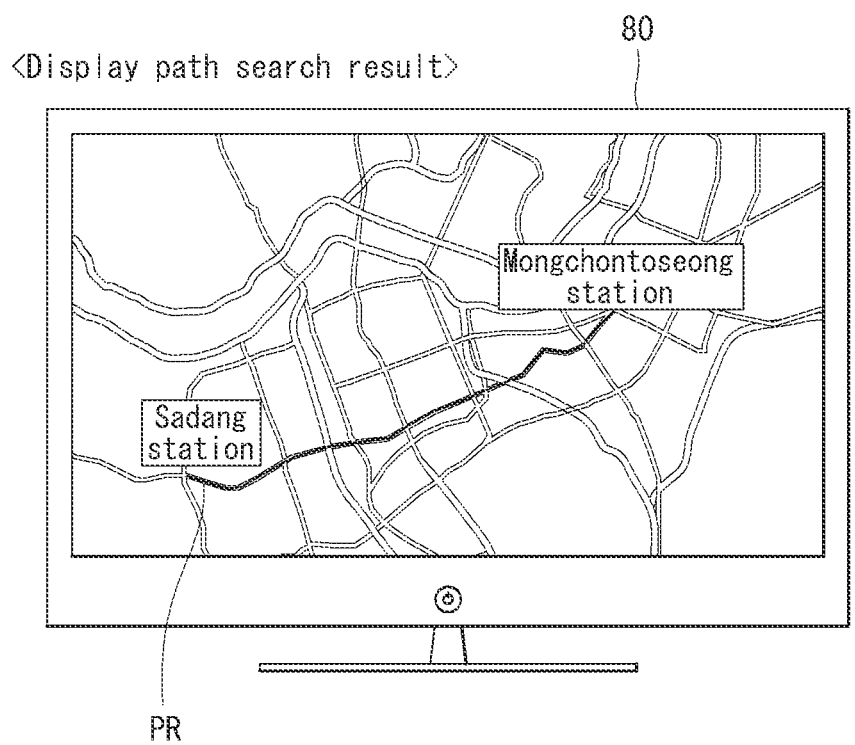

FIG. 4 is a flowchart illustrating operation of a data server according to a first exemplary embodiment of the present invention, FIG. 5 is a flowchart illustrating operation of an electronic device according to a first exemplary embodiment of the present invention, and FIG. 6 is a flowchart illustrating operation of a navigation device according to a first exemplary embodiment of the present invention.

Hereinafter, for convenience of description, it is assumed that the electronic device is an IPTV and the network 30 is Internet. Further, it is described as the video output unit 310 includes a display device.

Referring to FIGS. 4 and 5, operation of the IPTV 80 and the data server 70 will be first described.

The IPTV 80 is connected to the data server 70 according to a user request (S102). The IPTV 80 is connected to the data server 70 through an Internet web browser. The IPTV 80 transmits first identification information to the data server 70 (S104). Accordingly, the data server 70 receives the first identification information (S106). The first identification information may be a user ID for connecting to the data server 70, or may be an intrinsic identification number given to the IPTV 80.

In order to receive the user ID, the user can input a user description and identification information such as a social security number necessary for the data server 70. In this case, the user can input/register together second identification information of the mainly using navigation device 10.

The second identification information may be a serial number of the navigation device 10 or an identification number given to the network communication unit 120. The first identification information may be used for authentication of the user or the electronic device.

The IPTV 80 provides a user interface such as a graphical user interface (GUI) that can receive an input of user input information (S108). Thereafter, the IPTV 80 receives an input of the user input information using the GUI (S110). The user input information may be input by the user input device 83. The user input information may include a starting point, a destination point, a passing point, and an essential passing segment.

The GUI may be provided by a navigation application for appropriately receiving an input of the user input information necessary for forming path setting information according to the present invention from the user. The navigation application is provided by the data server 70 and is driven on Web. Alternatively, the navigation application is stored at the IPTV 80 and may be driven in the IPTV 80. The navigation application provides the GUI and includes path search algorithm that searches for a path based on the user input information.

Thereafter, the IPTV 80 transmits the user input information to the data server 70 (S112).

The data server 70 receives the user input information (S114). The data server 70 acquires a moving path (hereinafter, moving path information) from the starting point to the destination point based on the user input information (S116). In order to acquire the moving path information, the data server 70 can use various path search algorithm. For example, as described above, various path search algorithm according to a search condition such as a shortest path, an optimal path, and a shortest time path may be used for acquiring the moving path information. In this case, the user can select algorithm to search for a path. Alternatively, the user may select one of a plurality of moving paths acquired using a plurality of algorithm. The moving path information may be acquired from the IPTV 80 according to a case.

Hereinafter, reception of an input of the user input information will be described.

FIGS. 7 to 10 are diagrams illustrating screens that receive user input information according to a first exemplary embodiment of the present invention.

Figure 9:
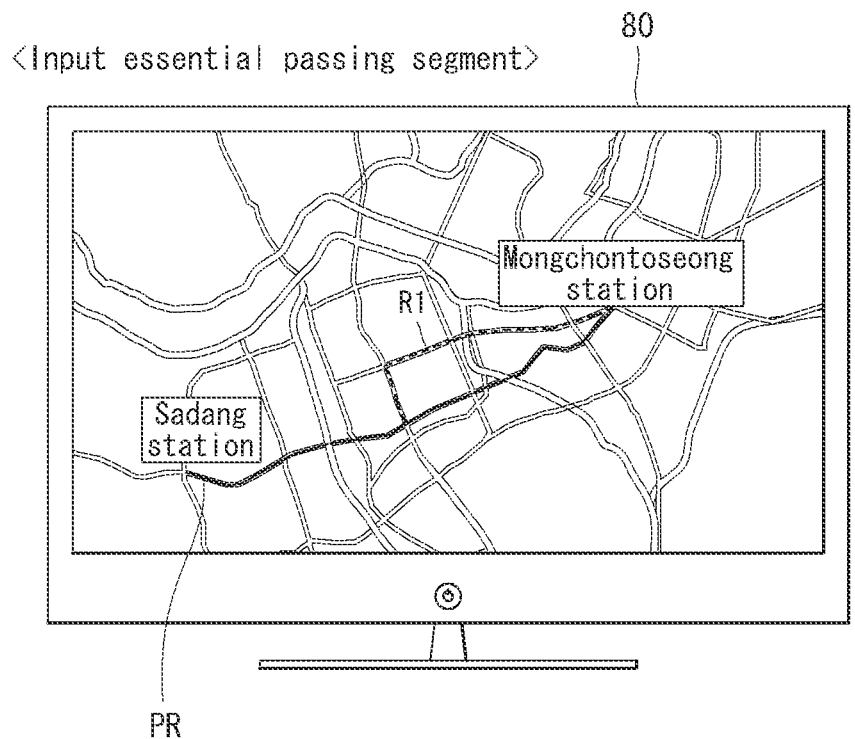
Figure 10:
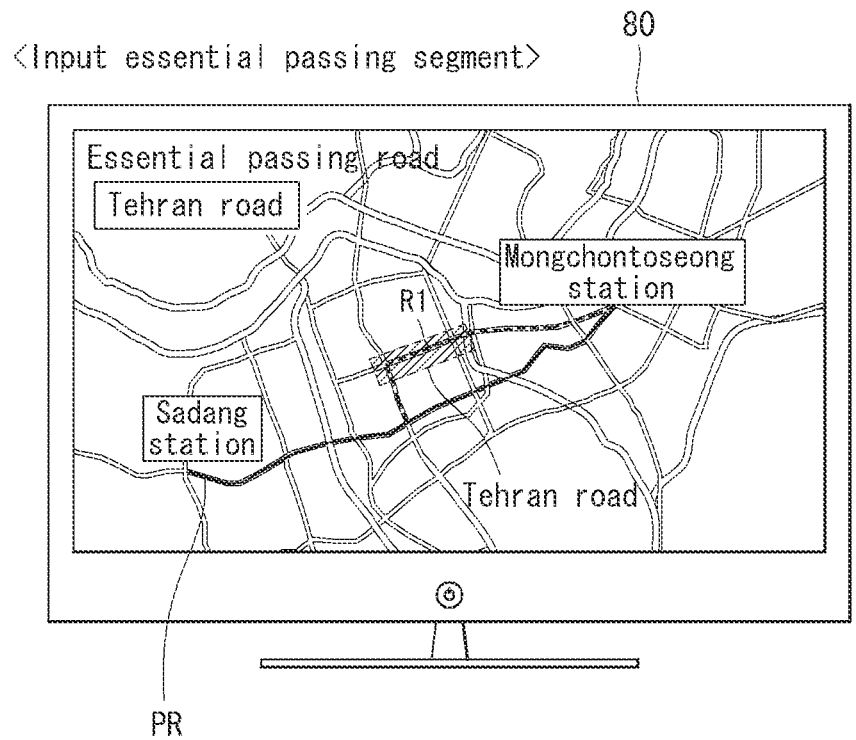

The user can input a starting point, a destination point, and a passing point. Accordingly, the data server 70 or the IPTV 80 acquires a preliminary moving path PR according to the input information and displays the preliminary moving path PR together with a map image in the display device 82 of the IPTV 80. When the user has a segment wishing to essentially pass (hereinafter, an essential passing segment) unlike the preliminary moving path PR, the user can input an essential passing segment R1 through the user input device 83. As shown in FIG. 9, in order to set the essential passing segment R1, the user can use a method of directly changing some segment of the preliminary moving path PR through an input device such as a touch screen or a mouse in order to pass through other segments. Alternatively, as shown in FIG. 10, the user may set the essential passing segment R1 by inputting a road name of the essential passing segment. In addition, various user interfaces for receiving an input of the essential passing segment R1 may be provided.

The user input information may include additional interest information. The additional interest information may be information about good taste restaurants, information about historical archaeological sites, and information specially interested and registered by the user. The additional interest information may be information normally specified and stored by the user as additional interest information, and may be information separately input while inputting the user input information. The additional interest information may include a position coordinate of a corresponding region and various information of the corresponding region. For example, after a user reads an article about 'Mongchon-toseong' the user may register the article as additional interest information. Alternatively, the additional interest information may be selected from information provided from the data server 70. For example, the data server 70 provides information about various recommended tourist sites, good taste restaurants, and historical archaeological sites at a periphery of a moving path acquired by the user input information, and the additional interest information may be information selected from the above information by the user. The additional interest information may be appropriately provided to the user through the navigation device 10.

This will be described later.

Although not shown in the drawings, the navigation application may provide trial driving information. For example, the navigation application may provide simulation drive like actual driving according to the preliminary moving path PR or the acquired moving path information.

Accordingly, the user can add or adjust the user input information.

Referring again to FIGS. 4 and 5, when the user input information is received (S114) and the moving path information is acquired (S116), the data server 70 generates path setting information based on the user input information and the acquired moving path information (S118). The data server 70 generates title information corresponding to the path setting information together with the path setting information (S118).

The path setting information includes a destination point input by the user input information. The path setting information may further include at least one of the passing point, the essential passing segment information, and the acquired moving path information. Further, the path setting information may further include the additional interest information.

The title information may be generated by the data server 70 based on the destination point and the passing point. For example, when it is input as the destination point is 'A' and the passing point is 'B', the title information may be generated like a 'path for the destination point A via the passing point B'. Further, the title information may be generated to reflect a date and time point in which the user input information is input to the title information. The title information may be generated by other various methods. Alternatively, the title information is the user input information and may be directly input by the user through the IPTV 80.

The data server 70 stores the generated path setting information and the title information (S120).

The path setting information and the title information may be matched to the first identification information and be stored.

Hereinafter, operation of the navigation device 10 and the data server 70 will be described with reference to FIGS. 4, 6, and 11.

Figure 11:
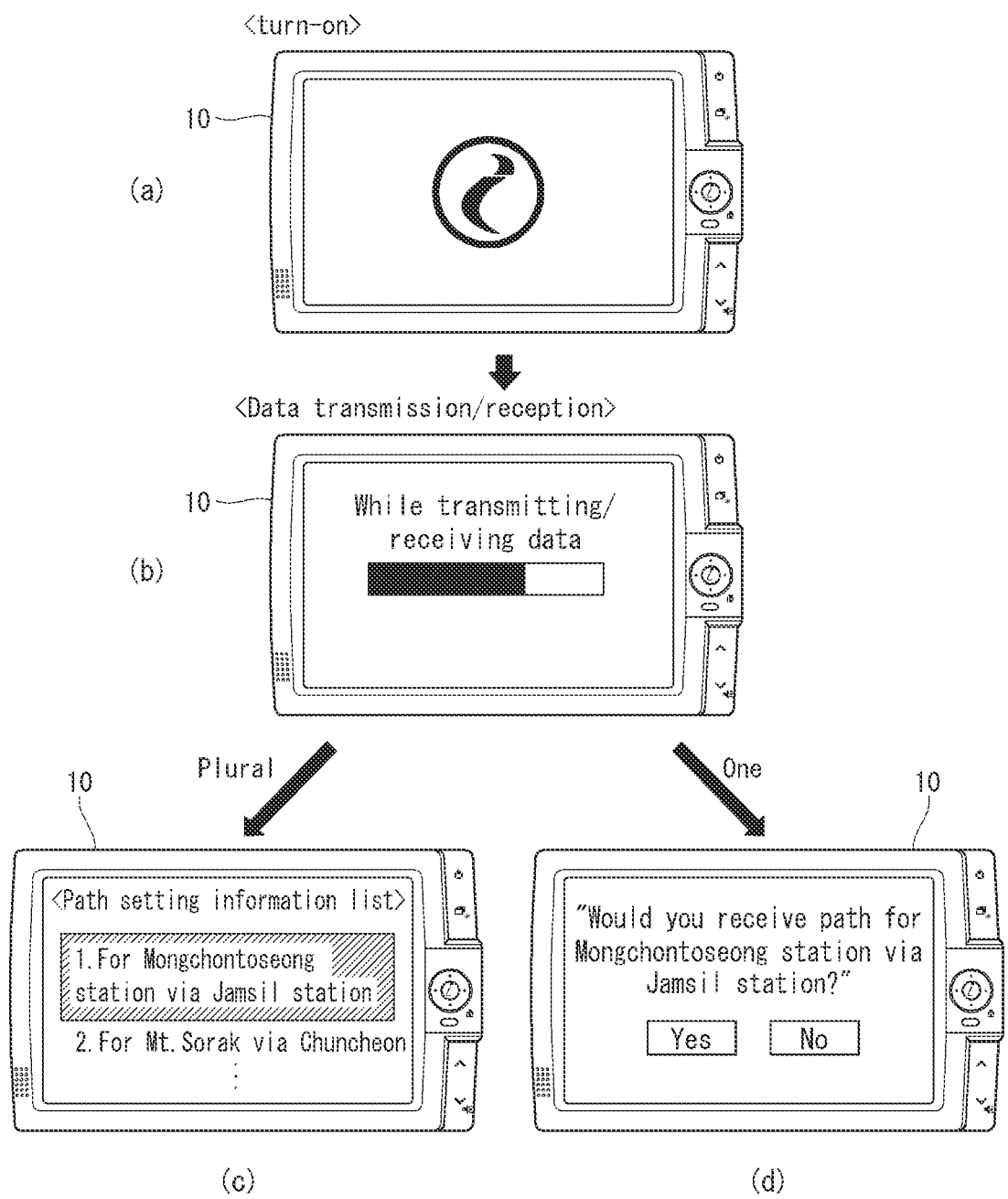
FIG. 11 is a diagram illustrating operation of a navigation device for receiving path setting information according to a first exemplary embodiment of the present invention.

FIG. 11 is a diagram illustrating operation of a navigation device for receiving path setting information according to a first exemplary embodiment of the present invention.

Referring to FIGS. 4 and 6, the navigation device 10 is turned on according to a predetermined signal (S122). When the navigation device 10 is turned on, the navigation device 10 is connected to the Internet 30 (S124), as described with reference to FIG. 1. A connection of the navigation device 10 to the Internet 30 may be performed by a user request or may be automatically performed by interlocking with the turn-on operation. For example, as shown in FIG. 11A, the navigation device 10 displays an initial screen together with a turn-on operation, and as shown in FIG. 11B, the navigation device 10 is connected to the Internet 30 by interlocking with the turn-on operation and displays a standby screen for transmitting and receiving various necessary data to and from the data server 70, as described later. The navigation device 10 is connected to the data server 70 through the Internet 30 (S126).

The navigation device 10 requests path setting information to the data server 70.

A request for the path setting information may be performed by the following series of operations.

First, the navigation device 10 transmits second identification information related to the navigation device 10 to the data server 70 (S128). The second identification information may be an intrinsic identification number (e.g., serial number of the navigation device) of the navigation device 10 and may be an intrinsic identification number related to the network communication unit 120 of the navigation device. Alternatively, the second identification information may be an intrinsic identification number given to the storage unit 400 of the navigation device 10. Alternatively, the second identification information may be intrinsic identification information given to the user, which is previously stored at the navigation device 10. The second identification information may be used for authenticating the user or the navigation device 10.

Thereafter, the navigation device 10 requests transmission of the number of path setting information matching to the second identification information and title information corresponding thereto (S130).

The data server 70 receives the request (S132), and the data server 70 searches for path setting information corresponding to the second identification information (S134).

In this case, in order to search for path setting information matching to the second identification information, the data server 70 searches for the first identification information corresponding to the second identification information. A search of the first identification information corresponding to the second identification information can be performed based on the second identification information registered when registering a user ID, as described above. Alternatively, a search of the first identification information corresponding to the second identification information may be performed by searching for registered user information of the navigation device 10 by the second identification information and searching for first identification information corresponding to the user information among the first identification information. For example, identification information given to the network communication unit 120 may include information about a user of the network communication unit 120, and the data server 70 may search for the first identification information matching thereto using information about the user.

The data server 70 transmits the found path setting information and title information corresponding to the found path setting information to the navigation device 10 according to the search result (S136). In this case, the data server 70 may transmit the number of the path setting information together with the found path setting information and the title information. The data server 70 may transmit the number of the found path setting information and/or title information according to a request of the navigation device 10, as described above, but may transmit the found path setting information itself to the navigation device 10.

The navigation device 10 receives the title information and/or the number of the found path setting information (S138) and determines whether the number of the found path setting information is plural (S140).

If the number of the found path setting information is plural, the navigation device 10 selects to receive which information of a plurality of path setting information according to a predetermined signal (S142). For example, as shown in FIG. 11C, the navigation device 10 may display the received title information in the display device 310 and thus the user can select path setting information to receive based on the title information. The navigation device 10 may select one of the plurality of path setting information according to predetermined selection algorithm. For example, the navigation device 10 may select most recently generated path setting information.

Alternatively, the navigation device 10 may select path setting information generated based on most recently input user input information.

If the path setting information is one, the navigation device 10 determines whether a selection of the user to receive the found path setting information is received (S144), as shown in FIG. 11D. If the user selects not to receive the path setting information, the navigation device 10 is converted to a general path search mode (S146). For example, the navigation device 10 may receive a direct input of the user for a destination point and/or a passing point, search for a guidance path R, and guide the guidance path R to the user.

If a plurality of path setting information is searched for, the navigation device 10 requests to transmit one path setting information selected from the plurality of path setting information to the data server 70, or if one path setting information is searched for and reception of the found path setting information is requested by the user, the navigation device 10 requests to transmit the found one path setting information to the data server 70 (S148). Hereinafter, for convenience of description, both path setting information selected from a plurality of path setting information and one path setting information in which reception is requested is referred to as selected path setting information.

The data server 70 receives the request (S150) and transmits the selected path setting information to the navigation device 10 (S152). The navigation device 10 receives the selected path setting information (S154) and acquires a user moving path based on the received path setting information (S156). The user moving path can be acquired by a predetermined application stored in the navigation device 10.

Step S156 of acquiring the user moving path can be performed by various methods. For example, when the moving path information is included in the path setting information, the navigation device may acquire the user moving path identical to the moving path information. When the passing point is included in the path setting information, the navigation device 10 can acquire the user moving path to surely pass through the passing point. When the essential passing segment is included in the path setting information, the navigation device 10 can acquire the user moving path to surely pass through the essential passing point.

Figure 12:
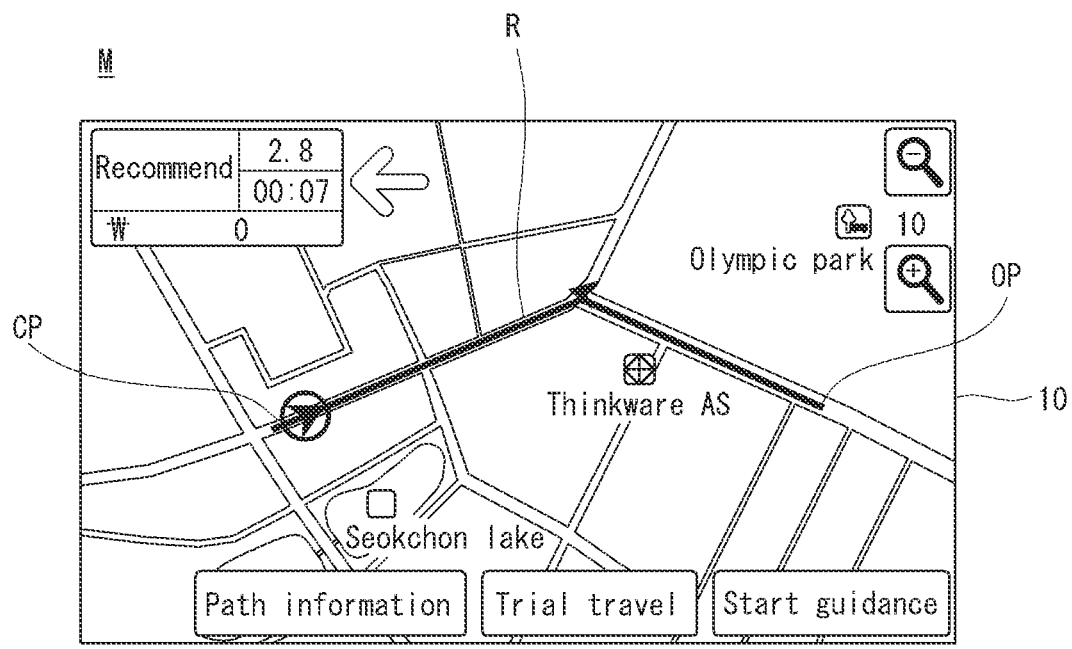
FIG. 12 is a diagram illustrating a navigation device for providing a guidance path according to an exemplary embodiment of the present invention.

FIG. 12 is a diagram illustrating a navigation device for providing a guidance path according to an exemplary embodiment of the present invention.

Referring to FIG. 12, after the navigation device 10 acquires the user moving path, the navigation device 10 sets the user moving path as the guidance path R and appropriately guides the guidance path R to a destination OP to the user by interlocking with a present position CP received through the position check unit 110.

Figure 13:
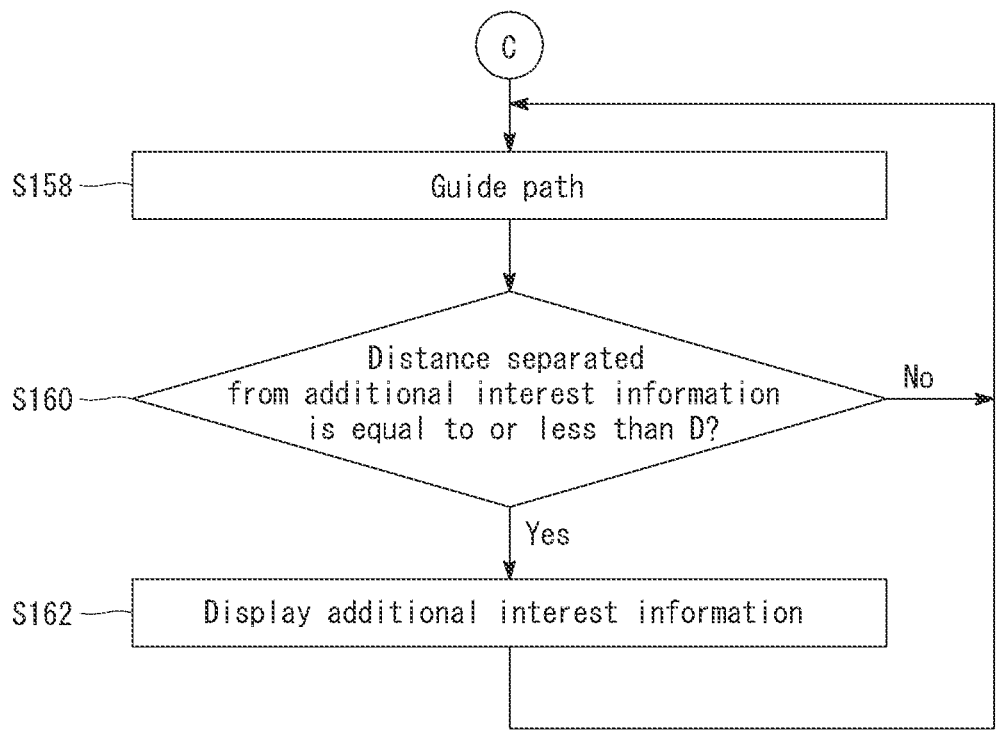
FIG. 13 is a flowchart illustrating a method in which a navigation device displays additional interest information according to a first exemplary embodiment of the present invention.
Figure 14:
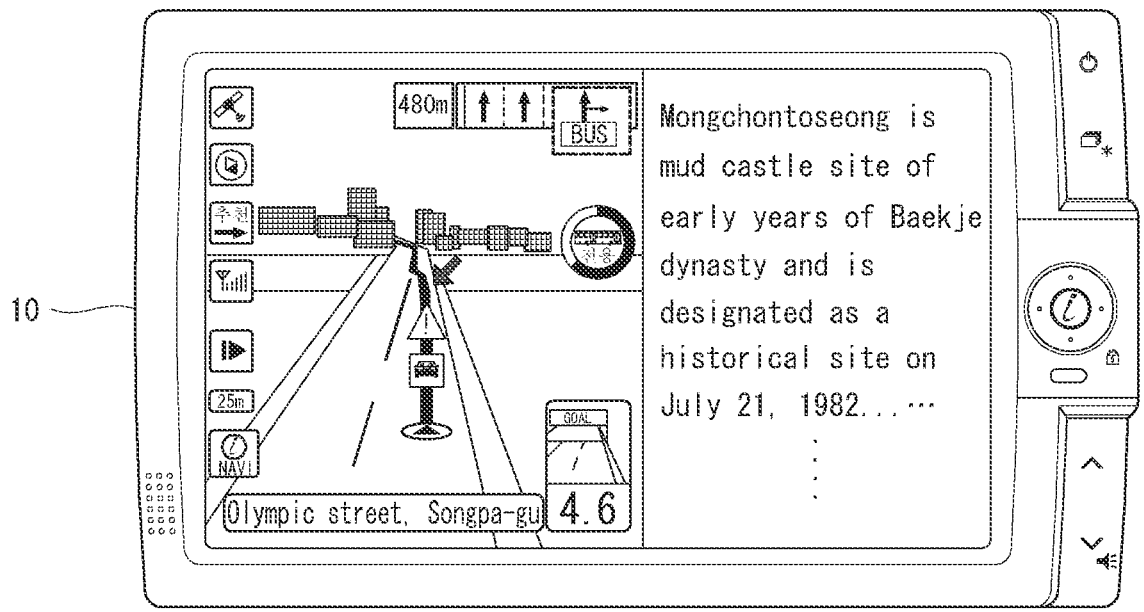
FIG. 14 is a diagram illustrating a navigation device for displaying additional interest information according to a first exemplary embodiment of the present invention.

FIG. 13 is a flowchart illustrating a method in which a navigation device displays additional interest information according to a first exemplary embodiment of the present invention, and FIG. 14 is a diagram illustrating a navigation device for displaying additional interest information according to a first exemplary embodiment of the present invention.

Referring to FIG. 13, when additional interest information is included in the path setting information, the navigation device 10 guides a path (S158), and the navigation device 10 determines whether a distance between a position corresponding to additional interest information and a present position of the navigation device 10 is a predetermined distance D or less (S160), and if a distance between a position corresponding to additional interest information and a present position of the navigation device 10 is a predetermined distance D or less, the navigation device 10 displays various information stored as the additional interest information through the display device 310 (S162).

For example, when information about 'Mongchontoseong' is registered as the additional interest information and a position of the navigation device 10 exists within a predetermined distance from 'Mongchontoseong', various information registered by the user for 'Mongchontoseong' may be displayed through the display device 310, as shown in FIG. 14. In this case, a screen of the display device 310 may be partitioned into a path guidance screen and an additional interest information display screen.

The additional interest information may include video, image, and audio information in addition to a text. When the additional interest information includes audio information, the additional interest information may be output through the audio output unit 320.

When transmission/reception of data is complete from the data server 70, the navigation device 10 releases a connection to the Internet 30. For example, after the navigation device 10 receives the path setting information from the data server 70 (S154), a connection of the navigation device 10 to the Internet 30 may be released. Thereby, a cost for transmission/reception of data can be minimized.

Hereinafter, operation of the navigation system according to a second exemplary embodiment of the present invention will be described in detail.

Figure 15:
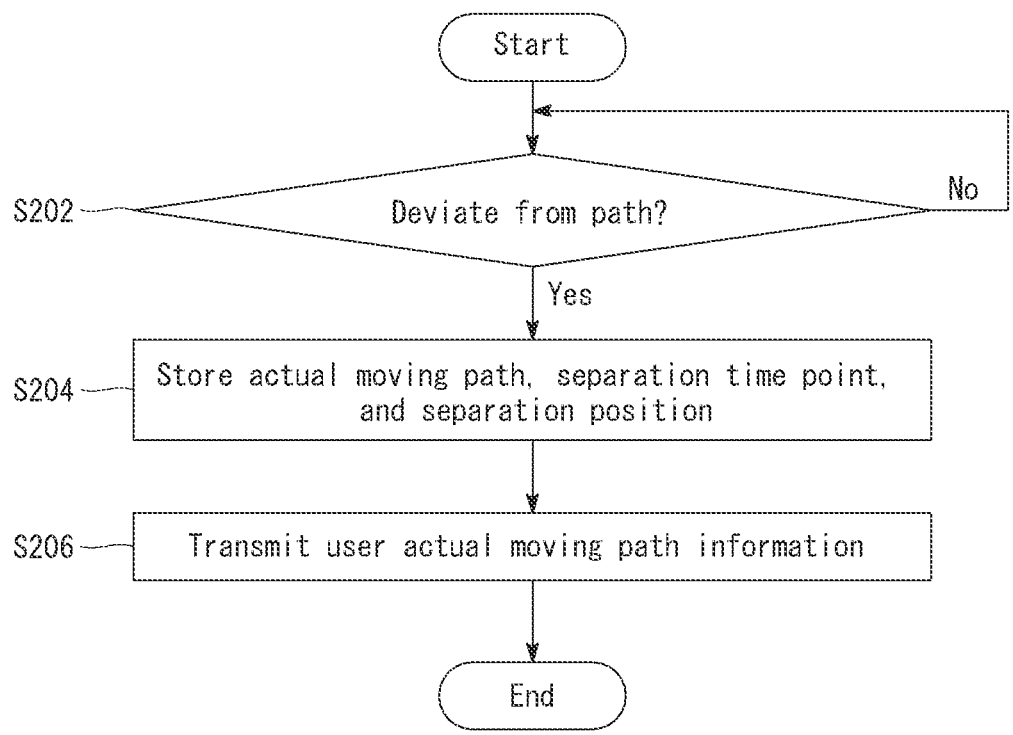
FIG. 15 is a flowchart illustrating operation of a navigation device according to a second exemplary embodiment of the present invention.
Figure 16:
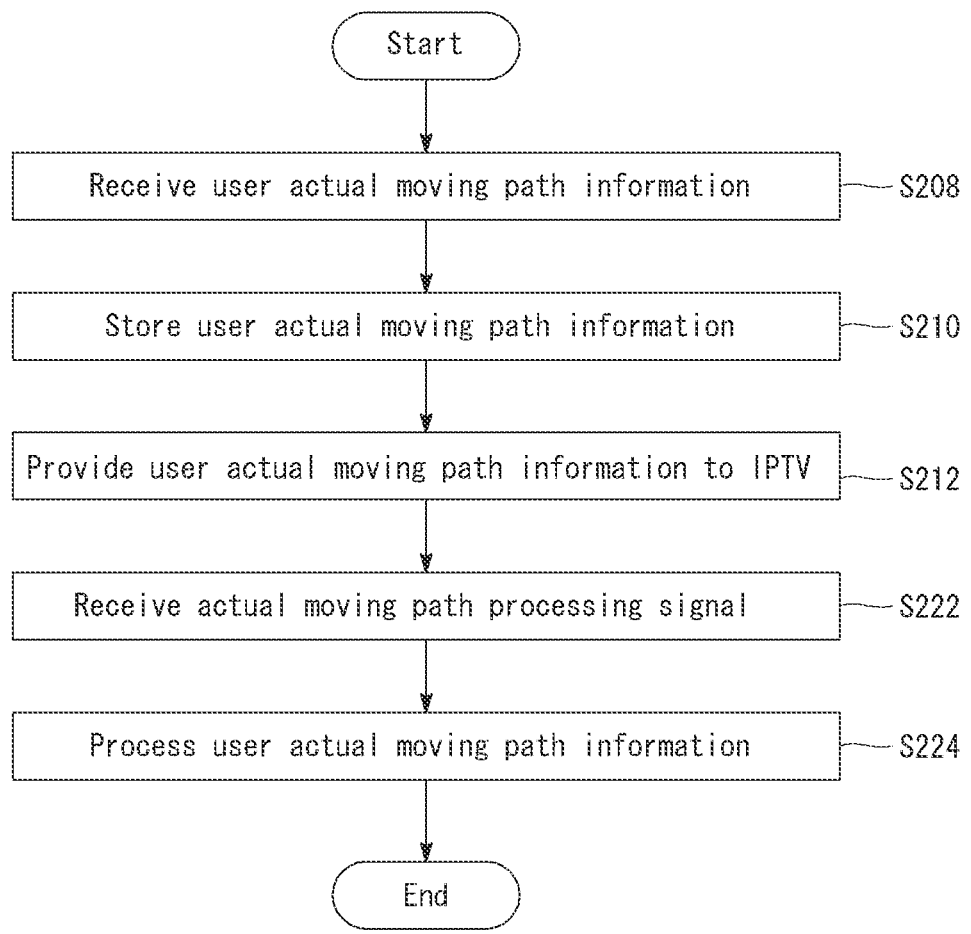
FIG. 16 is a flowchart illustrating operation of a data server according to a second exemplary embodiment of the present invention.
Figure 17:
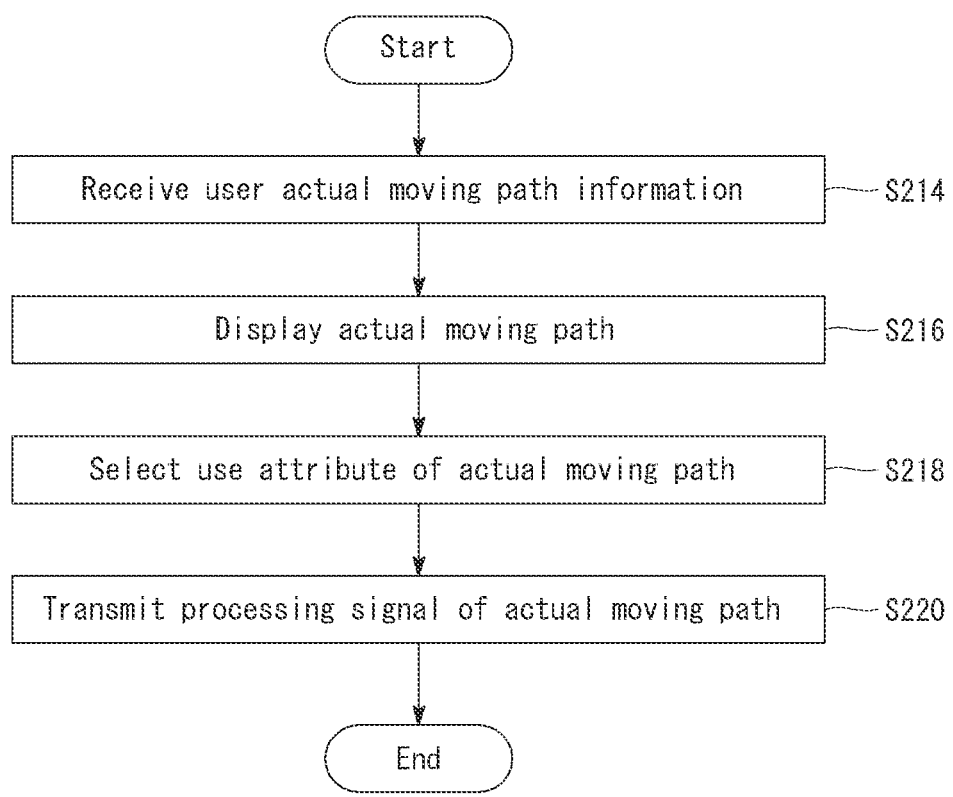
FIG. 17 is a flowchart illustrating operation of an electronic device according to a second exemplary embodiment of the present invention.

FIG. 15 is a flowchart illustrating operation of a navigation device according to a second exemplary embodiment of the present invention. FIG. 16 is a flowchart illustrating operation of a data server according to a second exemplary embodiment of the present invention. FIG. 17 is a flowchart illustrating operation of an electronic device according to a second exemplary embodiment of the present invention.

Referring to FIG. 15, operation of the navigation device 10 according to a second exemplary embodiment of the present invention will be described.

The navigation device 10 determines whether an actual moving path of the navigation device 10 deviates from a preset guidance path R while guiding the path (S202), and if an actual moving path of the navigation device 10 deviates from a preset guidance path R, the navigation device 10 stores the actual moving path at the storage unit 400 (S204). When storing the actual moving path, the navigation device 10 can store together a separation position and/or a separation time point, which are(is) a position and/or a time point in which the actual moving path deviates from the path. The preset guidance path R may be acquired according to the first exemplary embodiment of the present invention.

The navigation device 10 transmits the stored actual moving path to the data server 70 (S206). In this case, the separation position and/or separation time point may be transmitted together.

Hereinafter, the actual moving path, the separation position, and the separation time point are referred to as user actual moving path information. Second identification information, which is identification information related to the navigation device 10 together with the actual moving path information may be transmitted to the data server 70. Further, when the guidance path R is acquired according to the first exemplary embodiment of the present invention, the path may be also transmitted as identification information (e.g., the title information) about some path setting information.

The navigation device 10 transmits the user actual moving path information to the data server according to a predetermined time interval. Alternatively, when a turn-off signal of the navigation device 10 is received, before the navigation device 10 is turned off, the navigation device 10 may transmit the user actual moving path information to the data server 70. Alternatively, when the present position is at a periphery of a destination point, the navigation device 10 may transmit the user actual moving path information to the data server 70. When a connection between the navigation device 10 and the Internet 30 is released, in order to transmit user actual moving path information to the data server 70, the navigation device 10 may be connected to the data server 70 by connecting to the Internet 30.

Although not shown in the drawings, the navigation device 10 may store eco-driving information at the storage unit 500. The eco-driving information is information for determining whether a vehicle in which the navigation device 10 is installed economically drives by a predetermined reference.

For example, the eco-driving information may include information about an overspeed/low speed of the vehicle at a predetermined economy speed segment. The eco-driving information may include information about rapid acceleration/rapid retardation of a predetermined economy acceleration.

The eco-driving information may be transmitted to the data server 70, similarly to the user actual moving path information, and the data server 70 may store the eco-driving information. In this case, the eco-driving information may be accumulatively stored to correspond to the first identification information or the second identification information. When a request through the IPTV 80 exists, the eco-driving information stored at the data server 70 may be transmitted to the IPTV 80, the IPTV 80 may be provided the eco-driving information to the user. Further, the eco-driving information may be appropriately statistically processed and stored at the data server 70, or the eco-driving information may be formed in a graphic or in a pattern based on the statistically processed eco-driving information and may be stored at the data server 70. The statistically processed or graphically formed eco-driving information or the eco-driving information formed in a pattern may be transmitted to the IPTV 80, and the IPTV 80 can provide the statistically processed or graphically formed eco-driving information or the eco-driving information formed in a pattern to the user.

Referring to FIGS. 16 and 17, operation of the data server 70 and the IPTV 80 according to a second exemplary embodiment of the present invention will be described.

The data server 70 receives the user actual moving path information (S208). The data server 70 stores the user actual moving path information (S210). The user actual moving path information may be stored to correspond to the second identification information and/or the first identification information matching to the second identification information. Alternatively, the user actual moving information may be stored to correspond to identification information of the transmitted path setting information. The data server 70 provides the user actual moving path information to the IPTV 80 according to a predetermined signal (S212).

After the IPTV 80 receives the user actual moving path information (S214), the IPTV 80 displays an actual moving path included in the user actual moving path information in the display device 82 (S216). Step S214 of receiving the user actual moving path information can be performed by a separate request of the user or by interlocking with a turn-on operation of the IPTV 80. For example, when the IPTV 80 is turned-on, the most recent information corresponding to the first identification information related to the IPTV 80 may be received from the data server 70. Further, as described above, the IPTV 80 may be received the eco-driving information.

Thereafter, the IPTV 80 receives a selection of a use attribute of the user actual moving path from the user (S218). For example, the IPTV 80 may receive a selection from the user about whether to ignore the actual moving path, to use the actual moving path in order to update the moving path information according to the first exemplary embodiment of the present invention, to store the actual moving path as a user intrinsic preference path, or to share the actual moving path with other users.

The IPTV 80 transmits an appropriate processing signal of the actual moving path to the data server 70 according to a selection of a use attribute of the actual moving path (S220). The data server 70 appropriately processes the user actual path information according to reception of the processing signal.

For example, when a selection to ignore the actual moving path is received, the IPTV 80 may transmit no signal to the data server 70 or request deletion of the user moving path information.

The data server 70 deletes the user actual path information according to the deletion request.

When the actual moving path is selected to use for update of the moving path information, the IPTV 80 requests to store the actual moving path to the data server 70. In this case, the data server 70 replaces the moving path information included in the path setting information with the actual moving path according to the request and stores the actual moving path. Accordingly, when the same path setting information is selected later and transmitted to the navigation device 10, the moving path information that may be included in the path setting information is updated to the actual moving path and is transmitted to the navigation device 10.

When it is selected to use the actual moving path as a user intrinsic path, the IPTV 80 transmits an appropriate signal thereof, and the data server 70 can store the actual moving path as a path for a starting point and a destination point used for setting of the guidance path R. Accordingly, when the data server 70 is connected to the IPTV 80 or the navigation device 10, if the starting point and the destination point are input, in order provide the stored actual moving path as the guidance path R, the data server 70 can update path search algorithm provided in the IPTV 80 and/or the navigation device 10.

When it is selected to share the actual moving path with another user, the IPTV 80 transmits an appropriate signal thereof, and the data server 70 can separately store the actual moving path in order to share the actual moving path with other users.

Although not shown in the drawings, the data server 70 can use the user actual moving path information for algorithm for providing an optimal path to the user. For example, the data server 70 may accumulatively store the user actual moving path information and provide an optimal path through statistic calculation of an accumulated separation time point and an accumulated separation position included in the user actual moving path information. That is, at a similar time zone and a similar segment, when the user deviates from a preset path, the data server 70 determines the segment as a traffic jam segment at the time zone. Therefore, when searching for the segment at the time zone, the data server 70 may reflect the information to the algorithm not to pass through the segment, if possible. Further, for the found path of the same starting point and the same destination point, when it is determined that an actual moving segment different from the found path passes through the same segment several times, the segment is determined as a user's preference path and then when the segment is searched for, the algorithm can be updated to search for a path by reflecting the user's preference path.

The updated path search algorithm may be reflected to a navigation application stored at the IPTV 80 and may be reflected to path search algorithm of the navigation device 10.

By the present invention, the user can receive path guidance using the navigation device 10 through a minimum manipulation. For example, when path setting information is one, the user may receive a guide of a desired path with only a selection operation about whether to receive the path setting information. Even when a plurality of path setting information exists, the user may receive a guide of a desired path with only one operation of selecting one of displayed title information. Thereby, manipulation convenience of the navigation device 10 can increase and accident dangerousness can be reduced due to a manipulation of the navigation device while driving.

Further, by the present invention, the user can easily plan a trip together with families or acquaintances at a home. For example, the user can efficiently select a tourist site (a destination point and a passing point) by connecting to the data server 70 having various data using an IPTV or a PC at a home and specifically plan a trip by searching for a path to the tourist site and performing trial driving thereof. Further, by registering/inputting various additional interest information (historical archaeological sites, good taste restaurants, recommendation travel sites, etc.) around the found path as the user input information, when actually traveling, additional interest information can be provided through the navigation device and thus a boring moving time to a destination point can be usefully used.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

INDUSTRIAL APPLICABILITY

According to a navigation device, a navigation system, and a method of operating the same of the present invention, a user can receive path guidance using the navigation device through a minimum manipulation, and thus manipulation convenience of the navigation device can increase and accident dangerousness can be reduced due to a manipulation of the navigation device while driving, whereby the present invention has industrial applicability.

What is claimed is:

1. A non-transitory computer readable storage medium storing one or more programs, the one or more programs comprising instructions which, when executed by an electronic device with communication circuitry and a display, cause the electronic device to:
   transmit, through the communication circuitry to a server, identification information of the electronic device;
   communicate with the server through the communication circuitry to obtain an authentication of the electronic device from the server, based on the transmitted identification information;
   based on the authentication, display, through the display, a user interface that includes at least one executable object for setting a destination of a vehicle associated with the electronic device;
   based on receiving at least one user input on the at least one executable object, transmit a request through the communication circuitry to the server to provide a route to the destination that is set based on the at least one user input;
   receive, from the server through the communication circuitry, information regarding the route in response to the request;
   based on receiving the information regarding the route, display, through the display, a user interface that includes an electronic map with summary information of the route from an origin to the destination;
   after displaying the user interface including the electronic map with the summary information, receive a user request to provide a preview of the route; and
   in response to the reception of the user request, display, before the vehicle is moved, through the display, detailed information of the route from the origin to the destination by displaying images for respectively representing views that are respectively viewed by a driver of the vehicle to be moved on the route,
   wherein the images are chronologically displayed according to the route from the origin to the destination.

2. The non-transitory computer readable storage medium of claim 1, wherein the identification information is usable for displaying the route to the destination via a display of an external electronic device that is mounted on a vehicle based on a communication between the external electronic device and the server.

3. The non-transitory computer readable storage medium of claim 2, wherein the summary information is displayed as superimposed on the electronic map.

4. The non-transitory computer readable storage medium of claim 3, wherein the one or more programs comprise instructions which, when executed by the electronic device, further cause the electronic device to:
   display a visual object for indicating the destination that is set based on the at least one user input as superimposed on the electronic map.

5. The non-transitory computer readable medium of claim 4, wherein the visual object for indicating the destination is displayed with information regarding point of interest (POI) located around the destination.

6. The non-transitory computer readable medium of claim 5, wherein the identification information is usable for displaying a visual object for indicating the destination within a candidate destination list via the display of the external electronic device based on the communication between the external electronic device and the server, and
   wherein the visual object that is displayed via the display of the external electronic device is configured with title name that is obtained based on a name of the obtained destination position.

7. A method performed by an electronic device with communication circuitry and a display, the method comprising:
   transmitting, through the communication circuitry to a server, identification information of the electronic device;
   communicating with the server through the communication circuitry to obtain an authentication of the electronic device from the server, based on the transmitted identification information;
   based on the authentication, displaying, through the display, a user interface that includes at least one executable object for setting a destination of a vehicle associated with the electronic device;
   based on receiving at least one user input on the at least one executable object, transmitting a request through the communication circuitry to the server to provide a route to the destination that is set based on the at least one user input;
   receiving, from the server through the communication circuitry, information regarding the route in response to the request;
   based on receiving the information regarding the route, displaying, through the display, a user interface that includes an electronic map with summary information of the route from an origin to the destination;
   after displaying the user interface including the electronic map with the summary information, receiving a user request to provide a preview of the route; and
   in response to the reception of the user request, displaying, before the vehicle is moved, through the display, detailed information of the route from the origin to the destination by displaying images for respectively representing views that are respectively viewed by a driver of the vehicle to be moved on the route,
wherein the images are chronologically displayed according to the route from the origin to the destination.

8. The method of claim 7, wherein the identification information is usable for displaying the route to the destination via a display of an external electronic device that is mounted on a vehicle based on a communication between the external electronic device and the server.

9. The method of claim 8, wherein the summary information is displayed as superimposed on the electronic map.

10. The method of claim 9, further comprising:
displaying a visual object for indicating the destination that is set based on the at least one user input as superimposed on the electronic map.

11. The method of claim 10, wherein the visual object for indicating the destination is displayed with information regarding point of interest (POI) located around the destination.

12. The method of claim 11, wherein the identification information is usable for displaying a visual object for indicating the destination within a candidate destination list via the display of the external electronic device based on the communication between the external electronic device and the server, and
wherein the visual object that is displayed via the display of the external electronic device is configured with title name that is obtained based on a name of the obtained destination position.

13. An electronic device comprising:
a memory configured to store instructions;
communication circuitry;
a display; and
a processor configured to execute the instructions to:
transmit, through the communication circuitry to a server, identification information of the electronic device;
communicate with the server through the communication circuitry to obtain an authentication of the electronic device from the server, based on the transmitted identification information;
based on the authentication, display, through the display, a user interface that includes at least one executable object for setting a destination of a vehicle associated with the electronic device;
based on receiving at least one user input on the at least one executable object, transmit a request through the communication circuitry to the server to provide a route to the destination that is set based on the at least one user input;
receive, from the server through the communication circuitry, information regarding the route in response to the request;
based on receiving the information regarding the route, display, through the display, a user interface that includes an electronic map with summary information of the route from an origin to the destination;
after displaying the user interface including the electronic map with the summary information, receive a user request to provide a preview of the route; and
in response to the reception of the user request, display, before the vehicle is moved, through the display, detailed information of the route from the origin to the destination by displaying images for respectively representing views that are respectively viewed by a driver of the vehicle to be moved on the route,
wherein the images are chronologically displayed according to the route from the origin to the destination.

14. The electronic device of claim 13, wherein the identification information is usable for displaying the route to the destination via a display of an external electronic device that is mounted on a vehicle based on a communication between the external electronic device and the server.

15. The electronic device of claim 14, wherein the summary information is displayed as superimposed on the electronic map.

16. The electronic device of claim 15, wherein the processor is further configured to execute the instructions to:
display a visual object for indicating the destination that is set based on the at least one user input as superimposed on the electronic map.

17. The electronic device of claim 16, wherein the visual object for indicating the destination is displayed with information regarding point of interest (POI) located around the destination.

* * * * *